(12) United States Patent
Nam (10) Patent No.: US 11,982,415 B1
(45) Date of Patent: May 14, 2024

(54) LAMP MODULE FOR VEHICLE

(71) Applicant: HYUNDAI MOBIS CO., LTD., Seoul (KR)

(72) Inventor: Gyung Mok Nam, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/366,985

(22) Filed: Aug. 8, 2023

(30) Foreign Application Priority Data

Dec. 6, 2022 (KR) .................. 10-2022-0169053

(51) Int. Cl.
*F21S 41/153* (2018.01)
*F21S 41/141* (2018.01)
(Continued)

(52) U.S. Cl.
CPC ........... *F21S 41/153* (2018.01); *F21S 41/143* (2018.01); *F21S 41/265* (2018.01); *F21S 41/285* (2018.01); *F21S 41/141* (2018.01); *F21S 41/151* (2018.01); *F21S 41/20* (2018.01); *F21S 41/25* (2018.01); *F21S 41/26* (2018.01); *F21S 41/27* (2018.01); *F21S 41/275* (2018.01); *F21V 5/007* (2013.01);
(Continued)

(58) Field of Classification Search
CPC .. F21S 41/20; F21S 41/25; F21S 41/26; F21S 41/265; F21S 41/27; F21S 41/275; F21S 41/285; F21S 41/141; F21S 41/143; F21S 41/151; F21S 41/153; F21V 5/007; F21V 5/008; F21V 5/04; F21V 5/043; G02B 3/02; G02B 2003/0093
See application file for complete search history.

(56) References Cited

U.S. PATENT DOCUMENTS

| 3,285,129 | A | * | 11/1966 | Marcatili | ................. G02B 3/04 |
| | | | | | 359/720 |
| 2018/0087736 | A1 | * | 3/2018 | Joerg | ...................... F21S 41/25 |
| 2022/0299185 | A1 | * | 9/2022 | Goncalves | ............ F21S 41/265 |

FOREIGN PATENT DOCUMENTS

| DE | 102013215359 B3 * | 2/2015 | ............ F21S 41/143 |
| FR | 3074256 B1 * | 4/2020 | |

(Continued)

OTHER PUBLICATIONS

Machine translation of WO 2023176444 A1 retrieved from the FIT database of PE2E search. (Year: 2023).*

(Continued)

*Primary Examiner* — Colin J Cattanach
(74) *Attorney, Agent, or Firm* — NovoTechIP International PLLC (57) ABSTRACT

Disclosed is a lamp module for a vehicle including a light source part including a board, and a plurality of light sources mounted on the board, a condensing lens part that condenses light emitted from the light source part, and an output lens part including an input surface, to which the light condensed by the condensing lens part is input, and an output surface, from which the light input to the input surface is output, the light sources are arranged on the board in an upward/downward direction, the light output through the output surface forms a specific beam pattern as unit light distribution patterns formed by the plurality of light sources overlap each other, and the input surface is formed to have a curved shape that is continuously distorted along the upward/downward direction.

10 Claims, 12 Drawing Sheets

(51) Int. Cl.
- *F21S 41/143* (2018.01)
- *F21S 41/151* (2018.01)
- *F21S 41/20* (2018.01)
- *F21S 41/25* (2018.01)
- *F21S 41/26* (2018.01)
- *F21S 41/265* (2018.01)
- *F21S 41/27* (2018.01)
- *F21S 41/275* (2018.01)
- *F21V 5/00* (2018.01)
- *F21V 5/04* (2006.01)
- *G02B 3/00* (2006.01)
- *G02B 3/02* (2006.01)

(52) U.S. Cl.
CPC ............ *F21V 5/008* (2013.01); *F21V 5/04* (2013.01); *F21V 5/043* (2013.01); *G02B 2003/0093* (2013.01); *G02B 3/02* (2013.01)

(56) References Cited

FOREIGN PATENT DOCUMENTS

| KR | 20180078951 A | * | 7/2018 |
| WO | WO-2023176444 A1 | * | 9/2023 |

OTHER PUBLICATIONS

Machine translation of KR 20180078951 A retrieved from the FIT database of PE2E search. (Year: 2023).*

Machine translation of FR 3074256 B1 retrieved from the FIT database of PE2E search. (Year: 2023).*

Machine translation of DE 102013215359 B3 retrieved from the FIT database of PE2E search. (Year: 2024).*

* cited by examiner

LAMP MODULE FOR VEHICLE

CROSS-REFERENCE TO RELATED APPLICATIONS

This application claims the benefit of priority to Korean Patent Application No. 10-2022-0169053, filed in the Korean Intellectual Property Office on Dec. 6, 2022, the entire contents of which are incorporated herein by reference.

TECHNICAL FIELD

The present disclosure relates to a lamp module for a vehicle.

BACKGROUND

Among lamps for a vehicle, headlamps are configurations that are mounted on left and right sides of a front side of a vehicle, and secures a front field of view of a driver by lighting light to the front side of the vehicle in a situation, such as nighttime driving and the like. The headlamps may be classified into a high beam that is used when the vehicle travels on a road with no vehicle, and a low beam that is used in a general road situation, except for a situation, in which the high beam is used.

Meanwhile, in recent years, an adaptive driving beam technology of forming a dark area in an area, in which an opposite vehicle is present, when the opposite vehicle approaches from an opposite side, in association with a sensor technology. Furthermore, to differentiate designs of the lamps for a vehicle, a technology of implementing a longitudinal lamp in a head lamp has been developed.

The conventional adaptive driving beam lamp includes a plurality of light sources for turning on or off the lamp individually, a condensing optical system that condenses the light irradiated from the light sources, and an aspheric lens that forms a focus and irradiates the light to a desired area, in which a pattern of a desired shape is to be formed. Furthermore, additionally, a shield member for preventing interferences between the individual light sources is provided.

However, when a beam pattern by the lamp for a vehicle is designed to have a specific range, there occurs no problem when a large-sized aspheric lens is used, but it is difficult to secure an irradiation angle for irradiating light to a sufficient area when a small-sized aspheric lens is used.

To solve the problem, a measure of securing an irradiation angle by connecting conventional lenses of small sizes is used. However, in this case, a problem of an intermittent feeling occurring in aspheric units in an external appearance of the lamp, and light may be lost or distorted in the aspheric units. Accordingly, it is necessary to improve a technology of preventing an external image of a lamp from being intermittent or an optical performance from being degraded while a beam pattern is formed by a plurality of unit light distribution pattern.

SUMMARY

The present disclosure has been made to solve the above-mentioned problems occurring in the prior art while advantages achieved by the prior art are maintained intact.

An aspect of the present disclosure provides a lamp module for a vehicle that implements horizontal unit light distribution patterns while a division structure is not applied to an output lens part in a longitudinal lamp.

Another aspect of the present disclosure provides a lamp module for a vehicle that enhances a degree of freedom of design of a lamp by continuously implementing an external image of a lamp without any intermittent feeling.

Another aspect of the present disclosure provides a lamp module for a vehicle that solves a design and functional limit of a conventional lamp for a vehicle manufactured to have a longitudinal shape.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp module for a vehicle includes a light source part including a board, and a plurality of light sources mounted on the board, a condensing lens part that condenses light emitted from the light source part, and an output lens part including an input surface, to which the light condensed by the condensing lens part is input, and an output surface, from which the light input to the input surface is output, the light sources are arranged on the board in an upward/downward direction, the light output through the output surface forms a specific beam pattern as unit light distribution pattern formed by the plurality of light sources overlap each other, and the input surface is formed to have a curved shape that is continuously distorted along the upward/downward direction such that the plurality of unit light distribution patterns are arranged in a leftward/rightward direction, and locations of centers of the unit light distribution patterns are different.

The condensing lens part may include a light input surface, to which the light emitted from the light sources is input, and a light output surface, from which the light input to the light input surface is output, the light input surface may include a plurality of unit light input surfaces corresponding to the plurality of light sources, and the light output surface may include a plurality of unit light output surfaces corresponding to the plurality of light sources.

The unit light output surfaces may have a convex form, of which a cross-section in the upward/downward direction is convex, and may have a curved shape that is continuously distorted along the leftward/rightward direction.

When an imaginary line obtained by connecting centers of the plurality of light sources is an imaginary center line and a center of a point, at which an optical axis of the light generated by the light sources meets the light sources and a point, at which the optical axis meets the input surface, is a central location of the optical axis, the central location of the optical axis of the plurality of light sources may be disposed at a location that is rotated about the imaginary center line as it goes downwards.

A shape of the input surface may be formed such that locations of the unit light distribution patterns corresponding to the plurality of light sources are changed along any one of a leftward direction and a rightward direction as they go in any one of an upward direction and a downward direction of the light source part.

A curvature of the input surface in the upward/downward direction may be smaller than a curvature of the input surface in the leftward/rightward direction.

A focus of the output lens part in the leftward/rightward direction may be located on a light output surface of the condensing lens part.

The lamp module may further include a correcting lens part spaced apart in an output direction of the output lens part and that transmits the light output from the output lens part.

The lamp module may further include a heat dissipating part disposed in a direction of the light source part, which is opposite to a direction facing the condensing lens part, supporting the board, and extending in the upward/downward direction.

A beam pattern of the light output through the output lens part may form a high beam.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail according to the accompanying drawings.

First, embodiments that will be described below are embodiments that are suitable for helping understand technical features of a lamp module for a vehicle according to the present disclosure. However, the present disclosure is neither limited to the embodiments that will be described below nor the technical features of the present disclosure is restricted by the described embodiments, and various modifications may be made within a technical range of the present disclosure.

Figure 1:
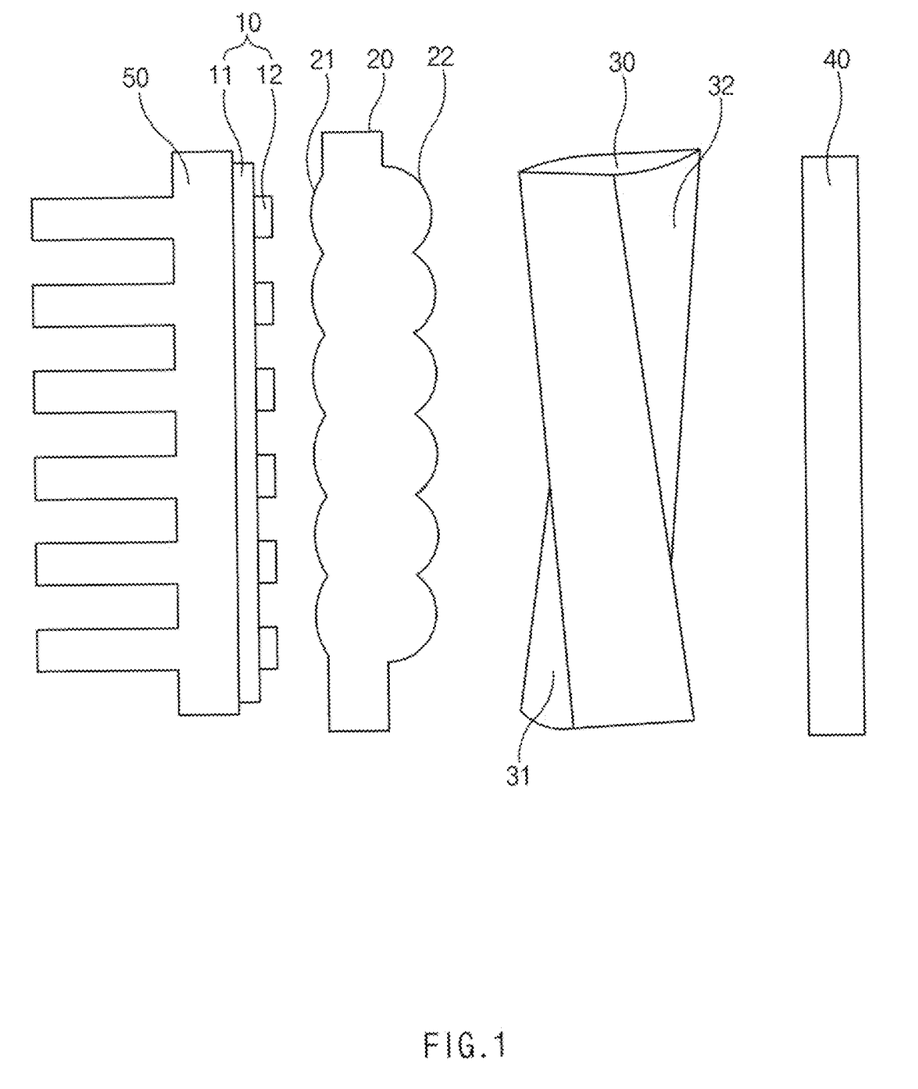
FIG. 1 is a side view schematically illustrating a configuration of a lamp module for a vehicle according to an embodiment of the present disclosure.
Figure 2A:
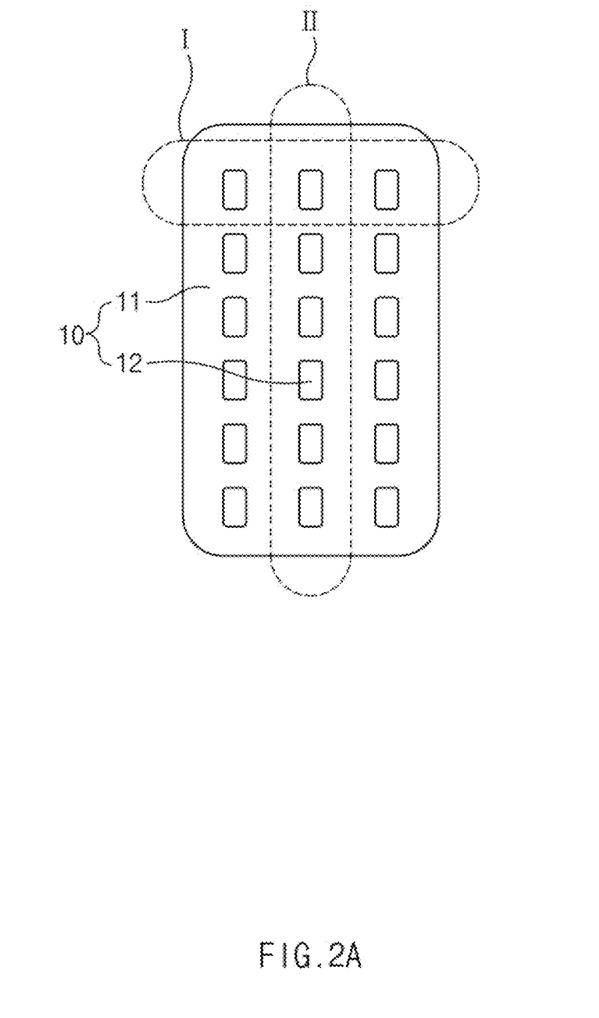
FIG. 2A is a front view of a light source part according to an embodiment of the present disclosure when viewed from a front side, and is a view illustrating group I including light sources arranged in a leftward/rightward direction and group II including light sources arranged in an upward/downward direction.
Figure 2B:
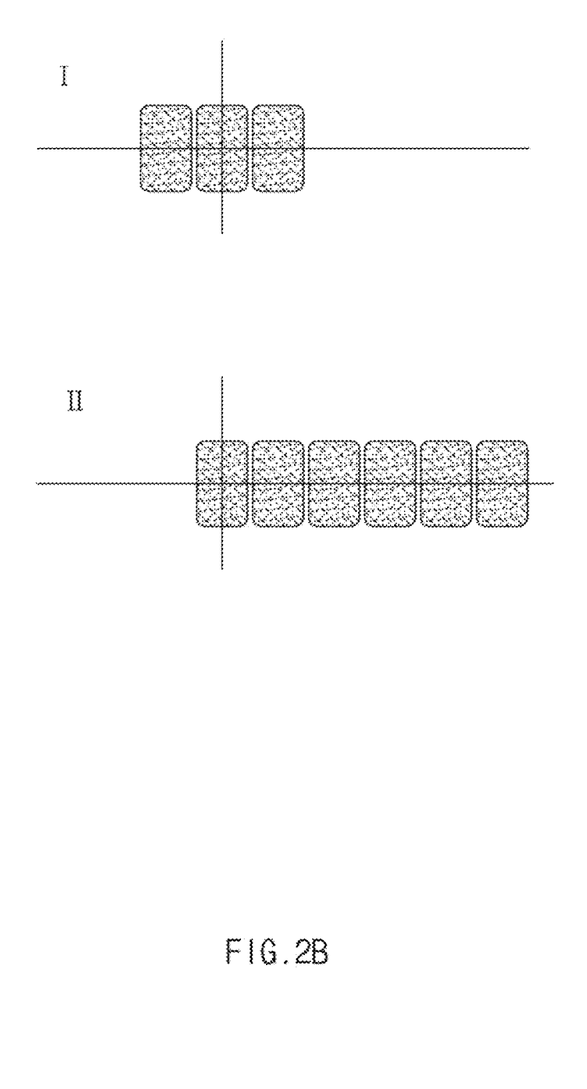
FIG. 2B illustrates a beam pattern by a lamp module for a vehicle according to an embodiment of the present disclosure, wherein an upper drawing is a view illustrating a pattern image by group I of FIG. 2A and a lower drawing is a view illustrating a pattern image by group II of FIG. 2A.
Figure 3:
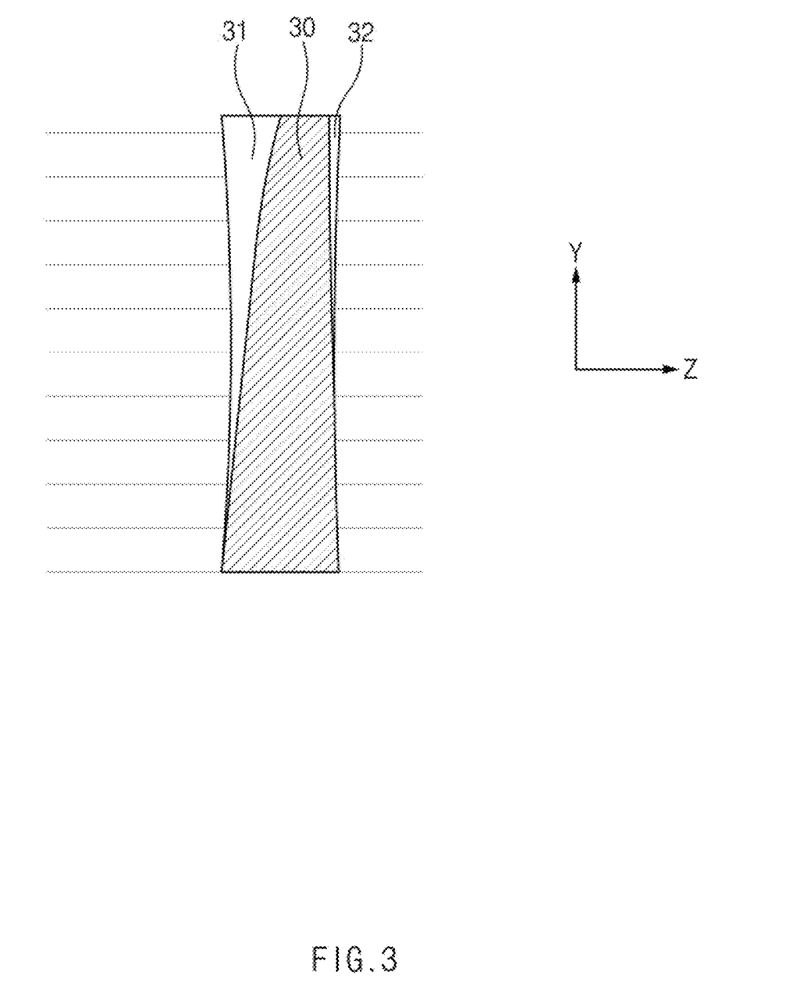
FIG. 3 is a side view illustrating a side surface of an output lens part according to an embodiment of the present disclosure.
Figure 4:
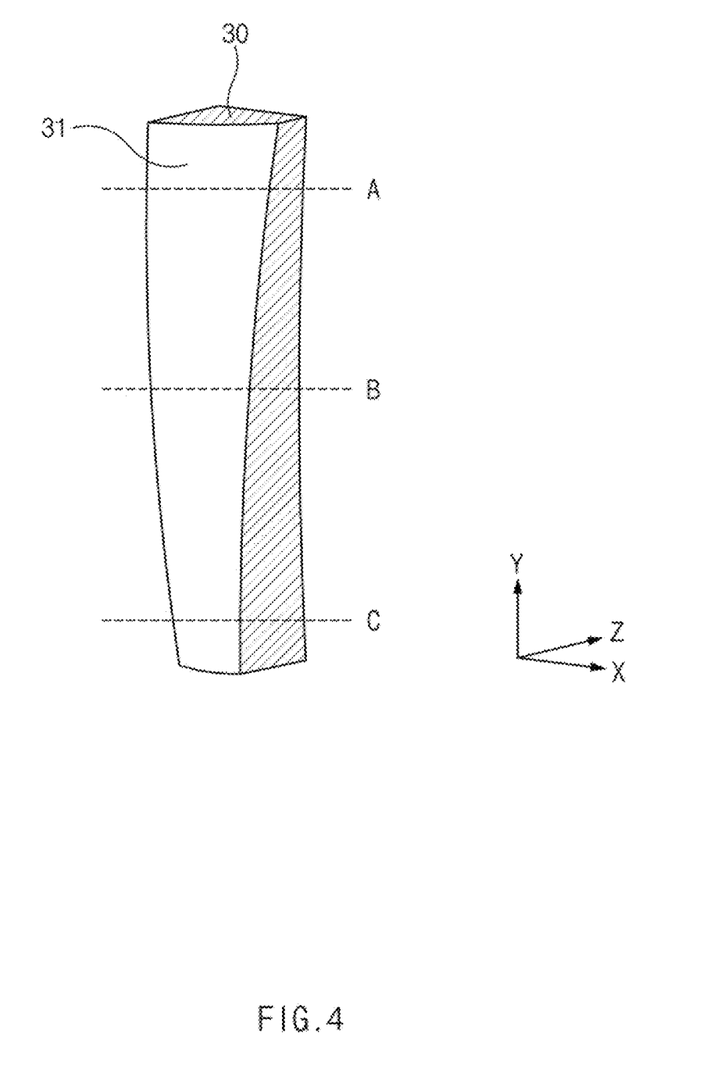
FIG. 4 is a perspective view illustrating an output lens part according to an embodiment of the present disclosure, and is a view illustrating an input surface.
Figure 5:
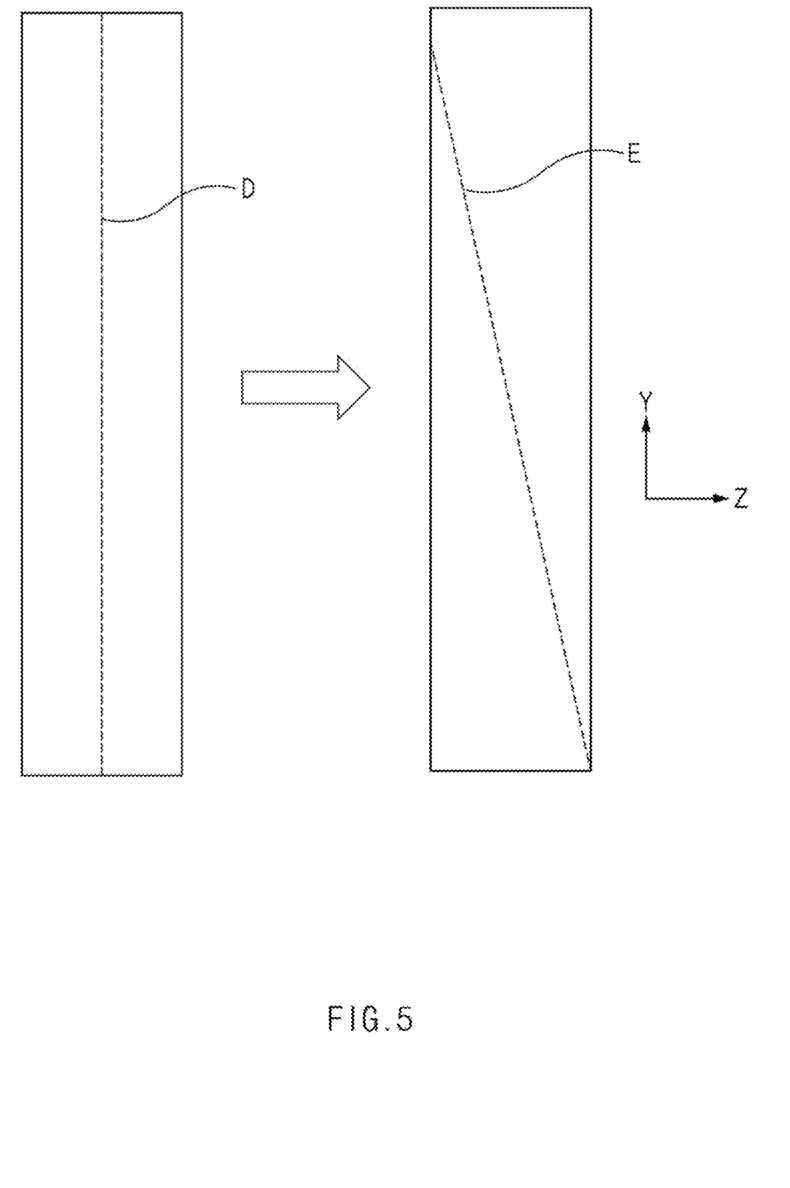
FIG. 5 is a view illustrating an imaginary line "D" obtained by connecting a plurality of light sources according to an embodiment of the present disclosure, and an imaginary line "E" obtained by connecting central locations of optical axes thereof.
Figure 6:
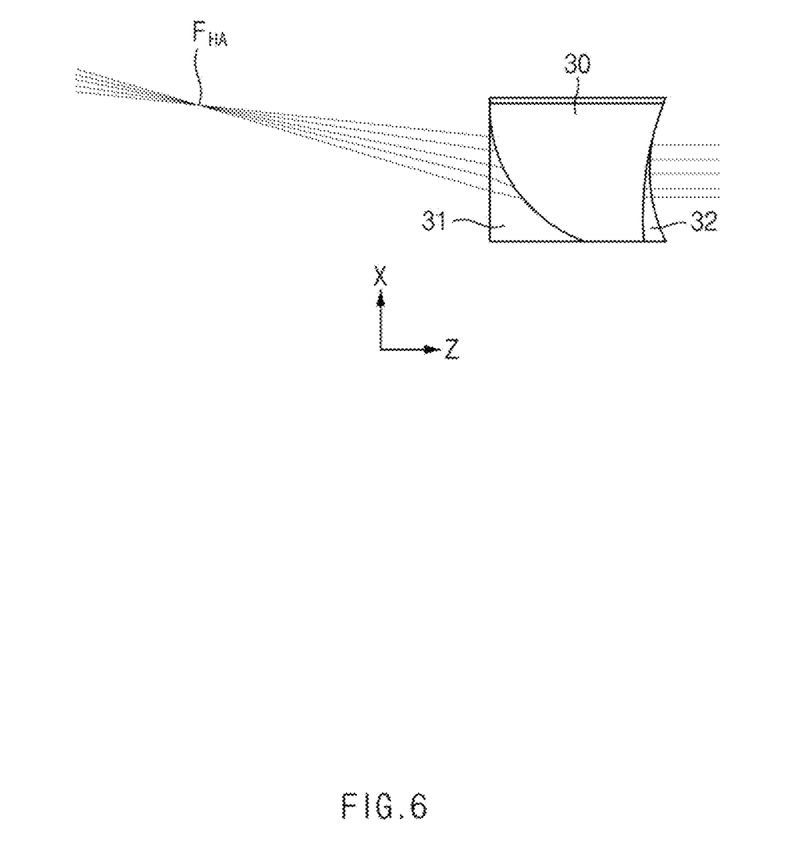
FIG. 6 illustrates a horizontal cross-section and an optical path of an output lens part illustrated in FIG. 4, and is a view illustrating a cross-section at height "A" and a focus FHA.
Figure 7:
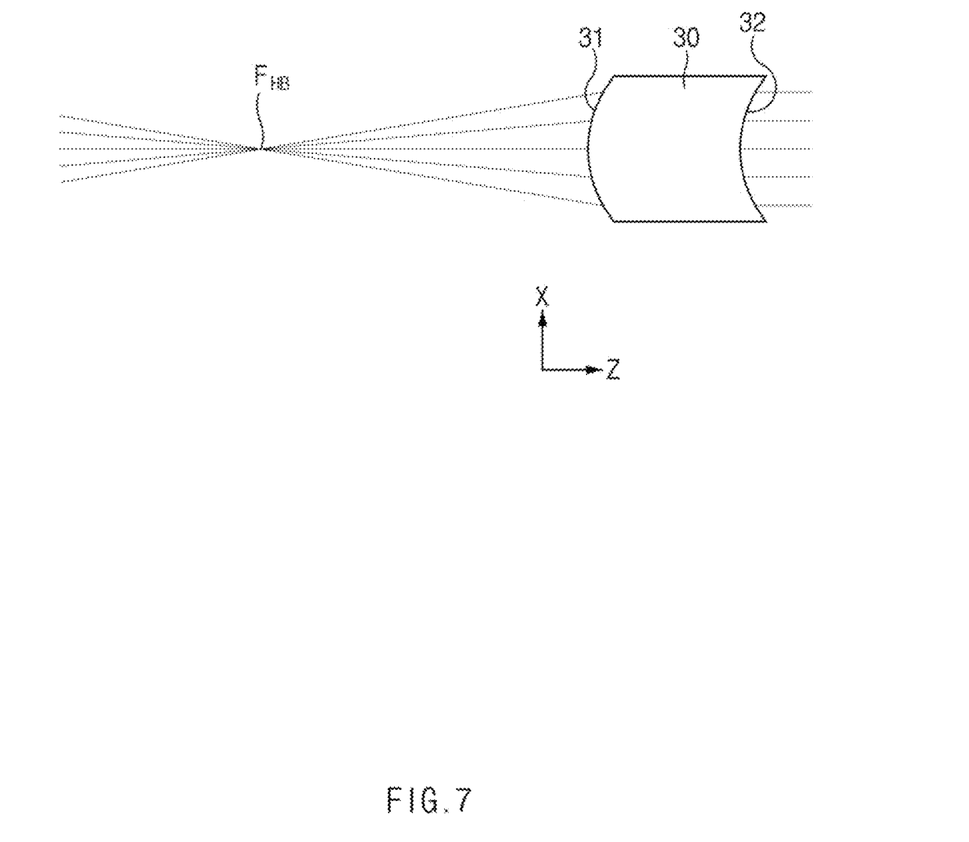
FIG. 7 illustrates a horizontal cross-section and an optical path of an output lens part illustrated in FIG. 4, and is a view illustrating a cross-section at height "B" and a focus FHB.
Figure 8:
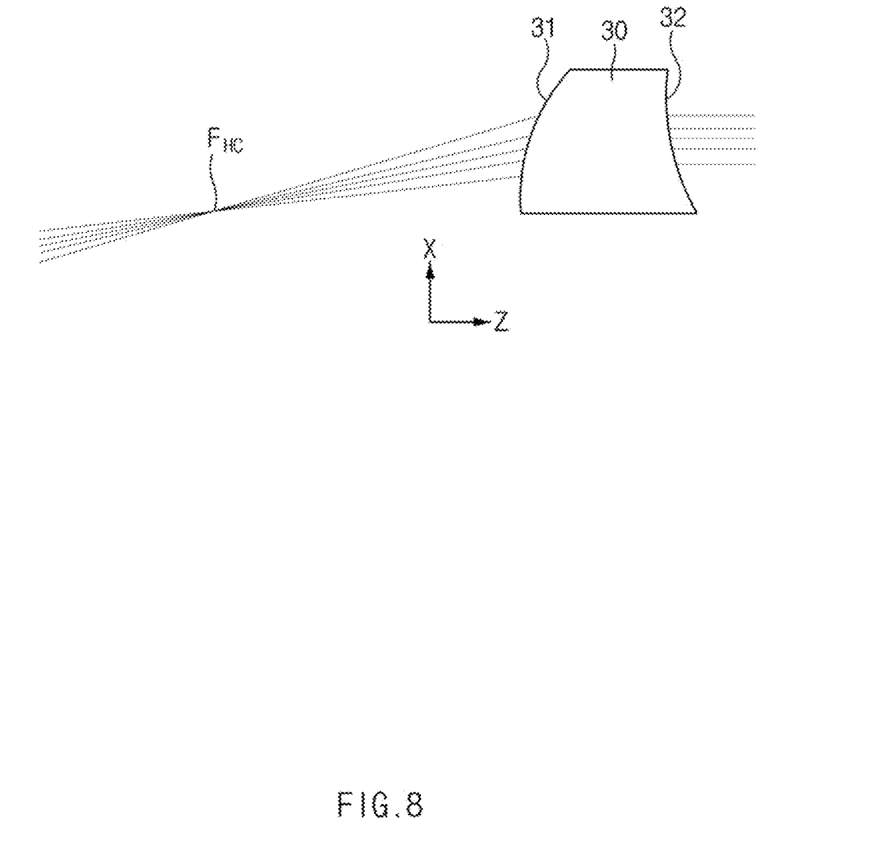
FIG. 8 illustrates a horizontal cross-section and an optical path of an output lens part illustrated in FIG. 4, and is a view illustrating a cross-section at height "C" and a focus FHC.
Figure 9:
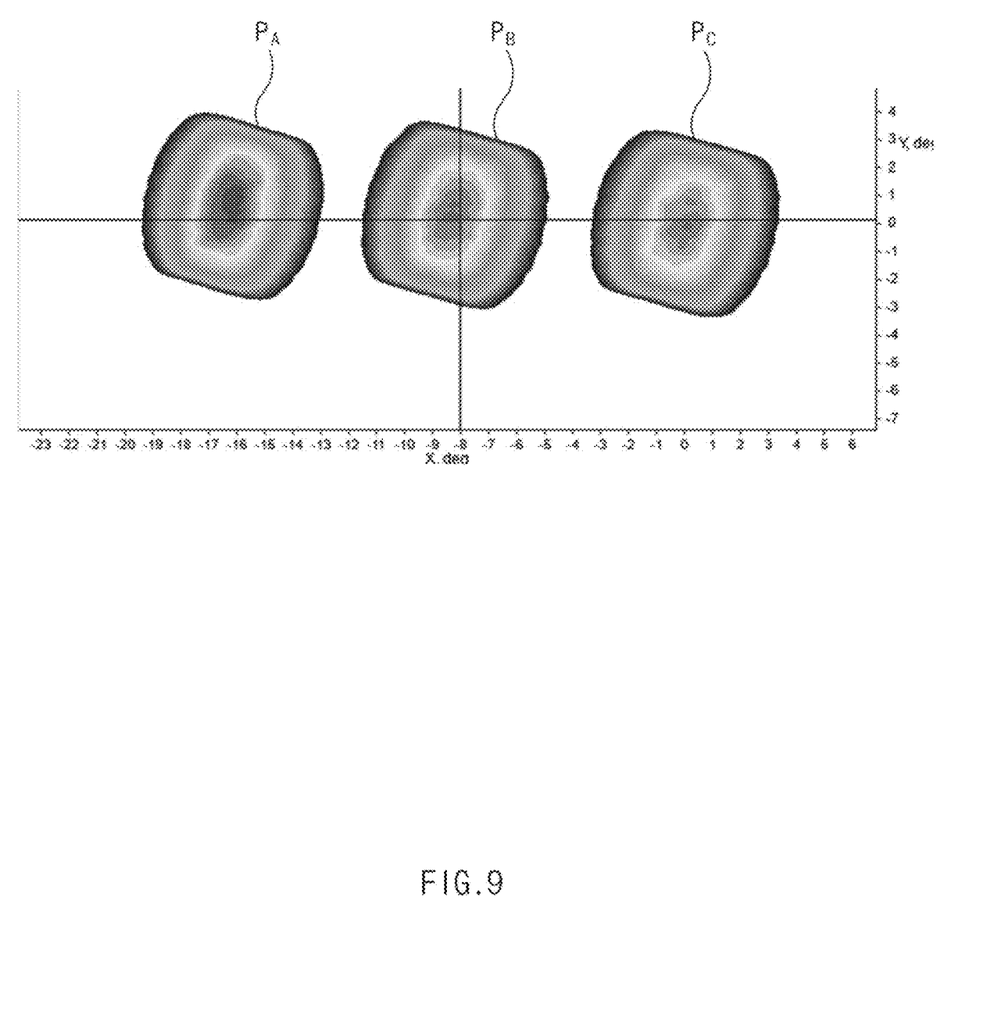
FIG. 9 is a view illustrating a pattern image PA generated by light that passed through height "A", a pattern image PB generated by light that passed through height "B", and a pattern image PC generated by light that passed through height "C"

FIG. 1 is a side view schematically illustrating a configuration of a lamp module for a vehicle according to an embodiment of the present disclosure. FIG. 2A is a front view of a light source part according to an embodiment of the present disclosure when viewed from a front side, and is a view illustrating group I including light sources arranged in a horizontal or leftward/rightward direction and group II including light sources arranged in a vertical or upward/downward direction. FIG. 2B illustrates a beam pattern by the lamp module for a vehicle according to an embodiment of the present disclosure, wherein an upper drawing is a view illustrating a pattern image by group I of FIG. 2A and a lower drawing is a view illustrating a pattern image by group II of FIG. 2A. FIG. 3 is a side view illustrating a side surface of an output lens part according to an embodiment of the present disclosure. FIG. 4 is a perspective view illustrating an output lens part according to an embodiment of the present disclosure, and is a view illustrating an input surface. FIG. 5 is a view illustrating an imaginary line "D" obtained by connecting a plurality of light sources according to an embodiment of the present disclosure, and an imaginary line "E" obtained by connecting central locations of optical axes thereof. FIG. 6 illustrates a horizontal cross-section and an optical path of an output lens part illustrated in FIG. 4, and is a view illustrating a cross-section at height "A" and a focus FHA. FIG. 7 illustrates a horizontal cross-section and an optical path of an output lens part illustrated in FIG. 4, and is a view illustrating a cross-section at height "B" and a focus FHB. FIG. 8 illustrates a horizontal cross-section and an optical path of the output lens part illustrated in FIG. 4, and is a view illustrating a cross-section at height "C" and a focus FHC. FIG. 9 is a view illustrating a pattern image PA generated by light that passed through height "A", a pattern image PB generated by light that passed through height "B", and a pattern image PC generated by light that passed through height "C".

Figure 10:
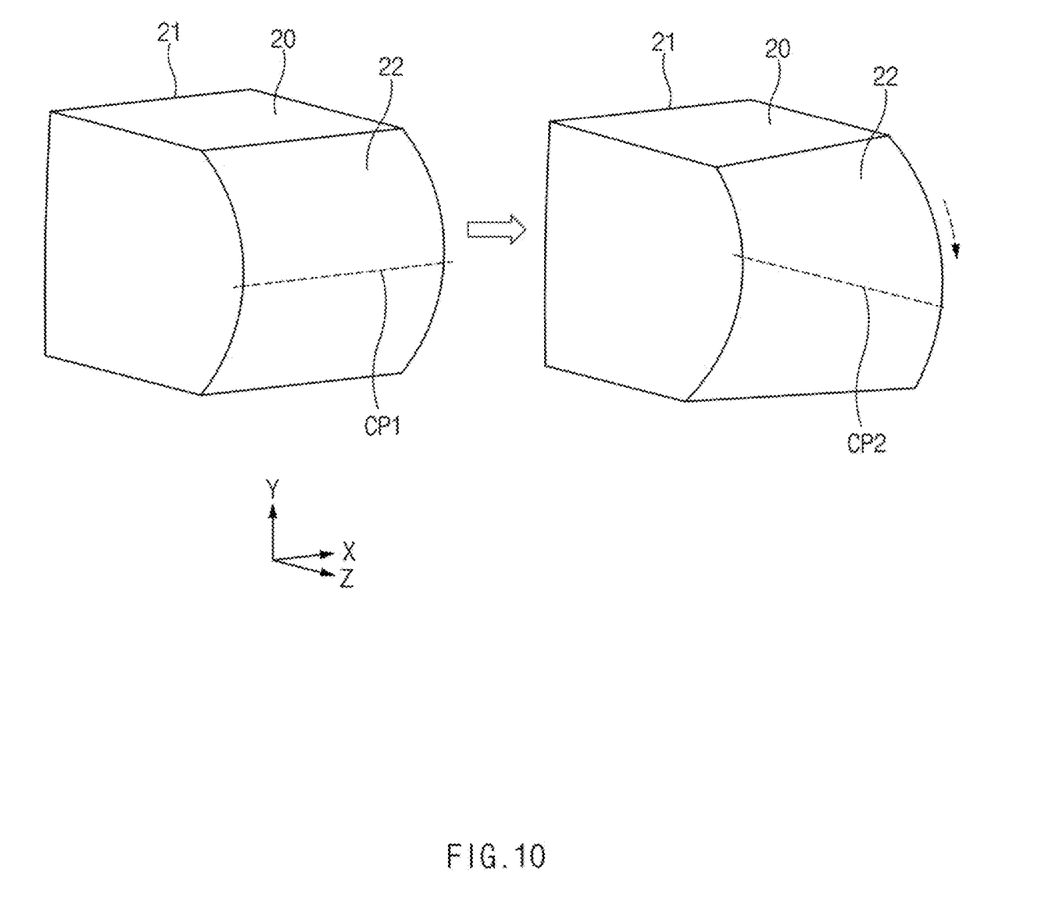
FIG. 10 illustrates a condensing lens part according to an embodiment of the present disclosure, and is a perspective view illustrating a light output surface in a form (a left drawing) that is not distorted, and a light output surface in a distorted form (a right drawing)
Figure 11:
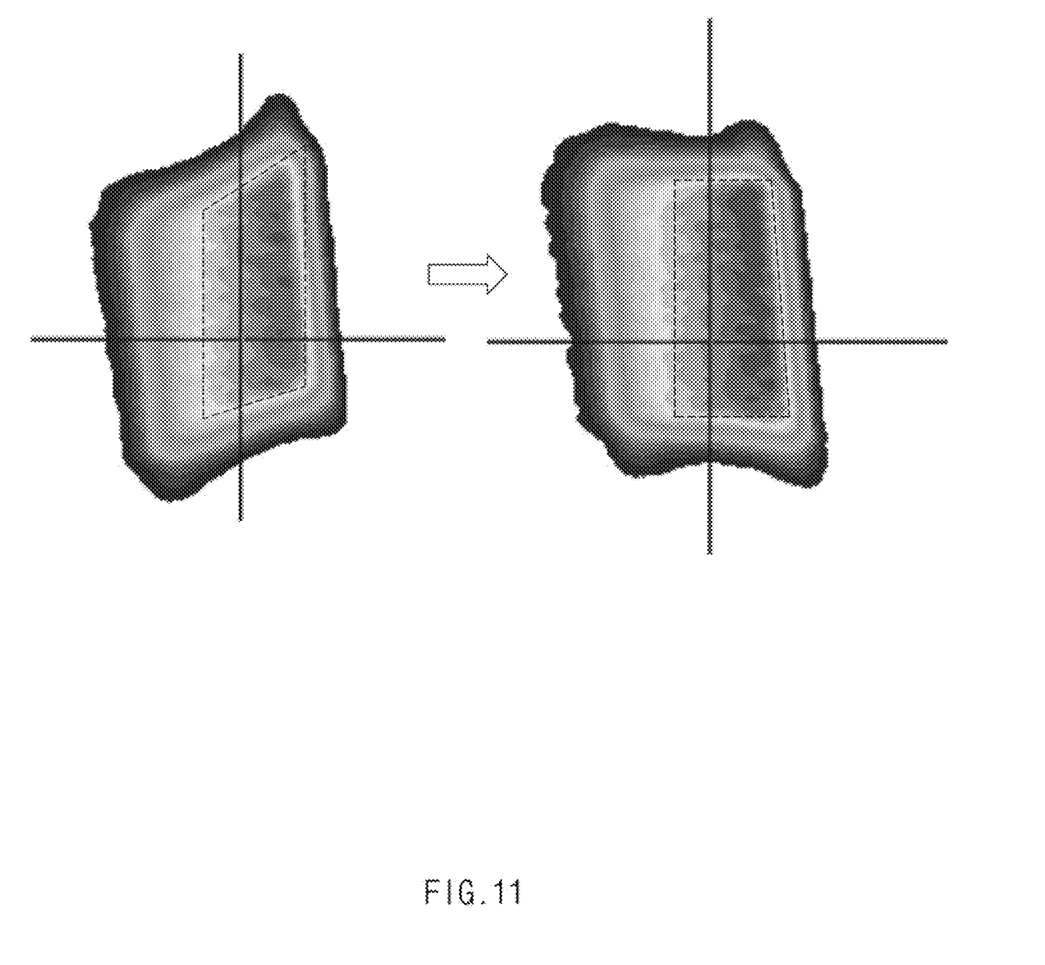
FIG. 11 illustrates a beam pattern image according to an embodiment of the present disclosure, and is a view illustrating a pattern image (a left image) by light that passed through a condensing lens part in a form, in which a light output surface is not distorted, and a pattern image (a right image) by light that passed through a condensing lens part in a form, in which a light output surface is distorted.

FIG. 10 illustrates a condensing lens part according to an embodiment of the present disclosure, and is a perspective view illustrating the light output surface in a form (a left drawing) that is not distorted, and the light output surface in a distorted form (a right drawing). FIG. 11 illustrates a beam pattern image according to an embodiment of the present disclosure, and is a view illustrating a pattern image (a left image) by light that passed through a condensing lens part in a form, in which the light output surface is not distorted, and a pattern image (a right image) by light that passed through a condensing lens part in a form, in which the light output surface is distorted.

Referring to FIGS. 1 to 11, an embodiment of the present disclosure includes a light source part 10, a condensing lens part 20, and an output lens part 30.

The light source part 10 includes a board, and a plurality of light sources 12 that are mounted on the board.

The board may be a printed circuit board (PCB), and the light sources 12 may be light emitting diodes (LEDs). The light generated by the plurality of light sources 12 may be emitted to an outside and may form a plurality of unit light distribution patterns.

Furthermore, the plurality of light sources 12 are arranged on the board in an upward/downward direction "Y".

In detail, the board may have a plate shape, and at least some of the plurality of light sources 12 may be arranged on the board in a longitudinal direction. In other words, the light source part 10 may include at least one of a plurality of light source (12) groups that are arranged in the upward/downward direction "Y". The light source part 10 may include one or two or more of the plurality of light source (12) groups that are arranged in the upward/downward direction (see FIG. 2A). The plurality of light source (12) groups also may be disposed in a transverse direction (the leftward/rightward direction).

The condensing lens part 20 is configured to condense the light emitted from the light source part 10. The condensing lens part 20 may provide a path, in which the light generated by the light source part 10 travels.

In detail, the condensing lens part 20 may include a light input surface 21, to which the light emitted from the light source 12 is input, and a light output surface 22, from which the light input to the light input surface 21 is output. Furthermore, the light input surface 21 may include a plurality of unit light input surfaces 21 respectively corresponding to the plurality of light sources 12, and the light output surface 22 may include a plurality of unit light output surfaces 22 respectively corresponding to the plurality of light sources 12. For reference, the light output surface 22 may include a plurality of unit light output surfaces, and in the specification, the same reference numerals are used for both cases.

Accordingly, the light generated by the individual light sources 12 may be output toward the output lens part 30 through the corresponding unit light output surfaces 22 after being input to the corresponding unit light input surfaces 21.

The output lens part 30 includes an input surface 31, to which the light condensed by the condensing lens part 20 is input, and an output surface 32, from which the light input to the input surface 31 is output. Furthermore, the light output through the output surface 32 may form a specific beam pattern as the unit light distribution patterns formed by the plurality of light sources 12 overlap each other.

For example, the lamp module for a vehicle according to the present disclosure may include an adaptive driving beam (ADB) system. The adaptive driving beam (ADB) system may automatically adjust a light illumination angle, a brightness, a width, and a length of the lamp when a large-sized vehicle or a preceding vehicle is detected during driving of the vehicle in a state, in which a high beam pattern is formed. Accordingly, dazzling of a driver of the large-sized vehicle or the preceding vehicle may be prevented, and a brightness of a road surface and a sign on a front side that have to be identified by the driver may be maintained.

A matrix type of the adaptive driving beam (ADB) lamp is a scheme of forming a blind zone in a space, in which the large-sized vehicle or the preceding vehicle is located, by selectively turning on or off the plurality of light sources 12 in unit of segments.

The input surface 31 of the output lens part 30 according to the present disclosure may be formed to have a continuous curved surface such that horizontal focuses of the output lens part 30 by the light sources 12 may be continuously changed.

In detail, the plurality of unit light distribution patterns are arranged in the leftward/rightward direction "X", and the input surface 31 is formed to have a curved shape that is continuously distorted along the upward/downward direction "Y" such that the locations of the centers of the unit light distribution patterns are different.

In more detail, the input surface 31 may have a curved surface that extends in the upward/downward direction "Y" and is continuous in the upward/downward direction. Because an entire area of the input surface 31 is not divided but has a continuous shape, an intermittent image of an external appearance of the lamp for a vehicle may be minimized.

Furthermore, the input surface 31 may have a curved shape that is distorted in a horizontal direction as it goes downwards (or upwards). Due to the shape, locations of the plurality of unit light distribution patterns that constitute the beam pattern in the leftward/rightward direction "X" may be changed. In this way, because the locations of the unit light distribution patterns in the leftward/rightward direction "X" is changed by the distorted curved shape of the input surface 31, horizontal unit light distribution patterns for forming a high beam pattern that is long leftwards and rightwards in a longitudinal lamp, in which the light sources 12 are disposed upwards and downwards may be formed.

Accordingly, according to an embodiment of the present disclosure, the horizontal unit light distribution patterns for implementing the adaptive driving beams may be formed without applying a division structure to the output lens part 30 in the longitudinal lamp.

Furthermore, according to an embodiment of the present disclosure, because a structure, in which the input surface 31 of the output lens part 30 is divided, is not applied, the external image of the lamp may be continuously implemented without any intermittent feeling, and thus, a degree of freedom of design of the lamp may be increased.

Furthermore, according to an embodiment of the present disclosure, because the division structure is not applied to the input surface 31 of the output lens part 30, an optical performance may be enhanced by minimizing optical loss by the division structure. Furthermore, because a shield membrane that is installed to prevent optical interferences of the divided lens is not necessary, the number of parts may be reduced, and a structure thereof may become simpler.

In this way, by using the embodiment of the present disclosure, a lamp module having an improved form may be provided by solving a design and functional limit of the conventional lamp for a vehicle manufactured to have a longitudinal shape.

Meanwhile, the plurality of unit light output surfaces 22 may be provided to correspond to the plurality of light sources 12 disposed in the upward/downward direction "Y". The plurality of unit light output surfaces 22 may be integrally formed, and may be classified into divided areas in an entire area of the light output surface 22 (see FIG. 1).

Referring to FIGS. 10 and 11, the unit light output surface 22 may have a form, of which a cross-section in the upward/downward direction "Y" is convex in an output direction "Z", and may have a curved shape that is continuously distorted along the leftward/rightward direction "X".

In detail, when an axis that passes through a center of the unit light output surface 22 and extends in the output direction "Z" is a central axis, the unit light output surface 22 may be formed to have a shape that is rotated about the central axis in the clockwise direction or the counterclockwise direction.

In other words, the unit light output surface 22 may be formed such that a most protruding part thereof in the output direction "Z" faces an upper side or a lower side as it goes to any one of the leftward/rightward direction "X". Due to the shape, the unit light output surface 22 may have a curved shape that is continuously distorted along the leftward/rightward direction "X".

As an example, as in the illustrated embodiment, when the unit light output surface 22 is viewed from the output lens part 30 in a direction that faces the condensing lens part 20, a most convex part of the unit light output surface 22 may become closer to a lower side as it goes from a left side to a right side. For reference, CP1 of the left drawing of FIG. 10 denotes an imaginary line obtained by connecting the most convex parts in a state, in which the unit light output surfaces 22 are not distorted. CP2 of the right drawing of FIG. 10 denotes an imaginary line obtained by connecting the most convex parts in a state, in which the unit light output surfaces 22 are distorted.

When the unit light output surface 22 of the condensing lens part 20 is formed to have a distorted curved surface, a phenomenon, in which the unit light distribution pattern is distorted and inclined by the output lens part 30, may be corrected in advance. In detail, due to the distorted shape of the output lens part 30, the unit light distribution pattern by the light that passes through the output lens part 30 may be formed to have a distorted pattern in the designed pattern (see the left drawing of FIG. 10 and the left pattern image of FIG. 11).

Because the light output surface 22 of the condensing lens part 20 is formed to have a distorted shape in consideration of a possibility of the unit light distribution pattern being distorted by the input surface 31 of the output lens part 30, the distortion of the unit light distribution pattern may be minimized.

That is, the condensing lens part 20 may function to form an intensity of illumination that is suitable for the lamp module for a vehicle by condensing the light emitted from the light source part 10 and function to correct the pattern by the light that passes through the output lens part 30 in advance such that the pattern is not distorted.

Meanwhile, hereinafter, a shape of the input surface 31 of the output lens part 30 and an optical operation due to the shape will be described in detail. However, the shape of the input surface 31 of the present disclosure may be variously modified within a technical range of the present disclosure.

An imaginary line obtained by connecting centers of the plurality of light sources 12 is defined as an imaginary center line, and a center of a point, at which an optical axis of the light generated by the light sources 12 meets the light sources 12 and a point, at which the optical axis meets the input surface 31, is defined as a central location of the optical axis. Then, the central location of the optical axis of the plurality of light sources 12 may be disposed at a location that is rotated about the imaginary center line as it goes downwards.

In detail, the input surface 31 and the output surface 32 of the output lens part 30 may be formed in an area that includes all of the areas corresponding to the plurality of light sources 12 and the plurality of unit light output surfaces 22. Due to the distorted shape of the input surface 31, the horizontal cross-sectional shape of the input surface 31 may be different according to a height of the output lens part 30.

Furthermore, accordingly, an optical path of the light that passes through the condensing lens part 20 may be changed according to the height of the output lens part 30 (see FIGS. 4, 6, 7, and 8).

Accordingly, when viewed in a direction that faces the condensing lens part 20 from the output lens part 30, a line obtained by connecting the central locations of the optical axes may be inclined to face one end thereof in the leftward/rightward direction "X" as it goes to one end thereof in the upward/downward direction "Y".

For example, FIG. 5 is a view in a direction that faces the condensing lens part 20 from the output lens part 30, in which line "D" in the left drawing of FIG. 5 is an imaginary line obtained by connecting the light sources 12 and the right drawing of FIG. 5 is an imaginary line obtained by connecting the central locations of the optical axes. Because the input surface 31 has the distorted shape, the central locations of the optical axes may be continuously moved horizontally as they go to a lower side.

In detail, the shape of the input surface 31 may be formed such that the locations of the unit light distribution patterns corresponding to the plurality of light sources 12 are changed along any one of the leftward/rightward direction "X" as they goes in any one of the upward/downward direction "Y" of the light source part 10.

For example, the unit light distribution patterns by the light sources 12 disposed in the upward/downward direction "Y" in area II of FIG. 2A may be arranged in the leftward/rightward direction "X" as in the pattern image illustrated in a lower drawing of FIG. 2B. This is a result caused when the optical path is changed due to the distorted shape of the input surface 31 and thus the location of the light distribution pattern is changed in the leftward/rightward direction "X".

Meanwhile, a curvature of the input surface 31 in the upward/downward direction "Y" may be smaller than a curvature of the input surface 31 in the leftward/rightward direction "X".

In detail, a focus of the output lens part 30 in a vertical direction may not be formed, and a horizontal coordinate location of the horizontal focus may be formed to be continuously changed. Accordingly, a curvature of the input surface 31 may be formed to be small on a vertical cross-section of the output lens part 30. When the output lens part 30 is viewed from one side, the light that passed through the output lens part 30 may travel in a form that is close to parallel light.

A focus (that is, a horizontal focus) of the output lens part 30 in the leftward/rightward direction "X" may be provided to be located on the light output surface 22 of the condensing lens part 20. Accordingly, most of the light that passes through the condensing lens part 20 to be condensed may reach the input surface 31 of the output lens part 30. Accordingly, according to the present disclosure, optical loss may be minimized and an optical efficiency may be enhanced.

Meanwhile, the present disclosure may further include a correcting lens part 40. The correcting lens part 40 may be disposed to be spaced apart in the output direction of the output lens part 30, and may be configured such that the light output from the output lens part 30 is output.

The correcting lens part 40 may form an external appearance of the lamp for a vehicle. Furthermore, the correcting lens part 40 may be configured to correct distortion of the beam pattern by the light that passes through the output lens part 30, due to the distorted shape of the input surface 31 of the output lens part 30. Accordingly, the correcting lens part 40 may be formed in consideration of a degree, by which the unit light distribution pattern is distorted by the output lens part 30.

Alternatively, the correcting lens part 40 may be formed to improve a shape of the pattern or improve an external appearance of the lamp for a vehicle in design. That is, the correcting lens part 40 may function not as an optical lens but as a part for improving a pattern image or a lamp image.

Meanwhile, referring to FIG. 1, an embodiment of the present disclosure may further include a heat dissipating part 50. The heat dissipating part 50 may be disposed in a direction of the light source part 10, which is opposite to a direction that faces the condensing lens part 20, may be provided to support the board, and may extend in the upward/downward direction "Y".

In detail, the board may be mounted on a surface of the heat dissipating part 50, which faces the output direction, and may be supported by the heat dissipating part 50. Furthermore, the heat dissipating part 50 may include a plurality of heat dissipating plates. Accordingly, the heat dissipating part 50 may dissipate heat generated by the board and the light sources 12.

In this way, according to an embodiment of the present disclosure, the horizontal unit light distribution pattern for implementing the adaptive driving beams may be formed while the division structure is not applied to the output lens part in the longitudinal lamp. Furthermore, according to an embodiment of the present disclosure, because the division structure is not applied to the input surface of the output lens part, an external image of the lamp may be continuously implemented without any intermittent feeling, and thus, a degree of freedom of design of the lamp may be increased.

According to an embodiment of the present disclosure, a lamp module of an improved form, which solves a design and functional limit of the conventional lamp for the vehicle manufactured to have a longitudinal shape may be obtained.

According to an embodiment of the present disclosure, the horizontal unit light distribution pattern for implementing the adaptive driving beams (ADBs) may be formed while the division structure is not applied to the output lens part in the longitudinal lamp.

According to an embodiment of the present disclosure, because the division structure is not applied to the input surface of the output lens part, an external image of the lamp may be continuously implemented without any intermittent feeling, and thus, a degree of freedom of design of the lamp may be increased.

According to an embodiment of the present disclosure, a lamp module of an improved form, which solves a design and functional limit of the conventional lamp for the vehicle manufactured to have a longitudinal shape may be obtained.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp module for a vehicle, comprising:
   a light source part including (1) a board and (2) a plurality of light sources arranged vertically on the board and configured to emit light;
   a condensing lens part configured to condense the light emitted from the light source part; and
   an output lens part extending longitudinally in a vertical direction and including (1) an input surface configured to receive the condensed light from the condensing lens part and (2) an output surface configured to output the condensed light received at the input surface,
   wherein the plurality of light sources respectively output a plurality of unit light distribution patterns that overlap with each other, and the light output through the output surface of the output lens part forms a beam pattern, and
   wherein the input surface of the output lens is curved and horizontally twisted continuously along the vertical direction.

2. The lamp module of claim 1, wherein the condensing lens part includes:
   a light input surface configured to receive the light emitted from the light sources and including a plurality of unit light input surfaces respectively corresponding to the plurality of light sources; and
   a light output surface configured to output the light received by the light input surface and including a plurality of unit light output surfaces respectively corresponding to the plurality of light sources.

3. The lamp module of claim 2, wherein the unit light output surface is vertically convex, and horizontally curved and continuously distorted.

4. The lamp module of claim 1, wherein:
   an imaginary center line is an imaginary line obtained by connecting centers of the plurality of light sources,
   a central location of an optical axis of the light generated by the plurality of light sources is a center of (1) a first point, at which the optical axis meets the plurality of light sources and (2) a second point, at which the optical axis meets the input surface, and
   the central location of the optical axis of the plurality of light sources is disposed at a location that is rotated about the imaginary center line as the central location extends downwards.

5. The lamp module of claim 4, wherein a shape of the input surface is formed such that locations of the plurality of unit light distribution patterns change in one of leftward and rightward directions as the input surface extends in one of upward and downward directions of the light source part.

6. The lamp module of claim 1, wherein a curvature of the input surface in the vertical direction is smaller than that of the input surface in a horizontal direction.

7. The lamp module of claim 1, wherein a focus of the output lens part in a horizontal direction is located on a light output surface of the condensing lens part.

8. The lamp module of claim 1, further comprising a correcting lens part spaced apart from the output lens part and configured to transmit the light output from the output lens part.

9. The lamp module of claim 1, further comprising a heat dissipating part extending in the vertical direction and configured to support the board.

10. The lamp module of claim 1, wherein a beam pattern of the light output through the output lens part forms a high beam.

* * * * *